(12) United States Patent
Ikeda et al.

(10) Patent No.: US 7,078,620 B2
(45) Date of Patent: Jul. 18, 2006

(54) MOUNTING STRUCTURE OF ON-VEHICLE ELECTRONIC CIRCUIT UNIT

(75) Inventors: Tomoki Ikeda, Tokyo (JP); Masashi Nakagawa, Tokyo (JP); Norio Tanaka, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/145,796

(22) Filed: Jun. 6, 2005

(65) Prior Publication Data
US 2005/0269121 A1 Dec. 8, 2005

(30) Foreign Application Priority Data
Jun. 7, 2004 (JP) .............................. 2004-168788

(51) Int. Cl.
*H02G 3/08* (2006.01)

(52) U.S. Cl. ..................... 174/50; 174/52.1; 174/58; 439/76.1; 439/76.2

(58) Field of Classification Search .................. 174/50, 174/17 R, 53, 58, 57, 52.1, 135; 220/3.2, 220/3.3, 3.8; 439/535, 76.1, 76.2, 949; 361/600, 361/601; 248/906
See application file for complete search history.

(56) References Cited

U.S. PATENT DOCUMENTS

| 5,895,277 A * | 4/1999 | Saka et al. .................. 439/76.2 |
| 6,034,876 A * | 3/2000 | Ohno et al. ................. 439/76.1 |
| 6,043,431 A * | 3/2000 | Kato ............................. 174/58 |
| 6,430,054 B1 * | 8/2002 | Iwata .......................... 439/76.2 |
| 6,600,658 B1 * | 7/2003 | Iwata ............................ 174/50 |
| 6,816,381 B1 * | 11/2004 | Takeuchi .................... 174/52.1 |
| 6,927,337 B1 * | 8/2005 | Kobayashi et al. ......... 174/52.1 |

FOREIGN PATENT DOCUMENTS

| JP | 6-232618 | 8/1994 |
| JP | 6-291529 | 10/1994 |

* cited by examiner

*Primary Examiner*—Angel R. Estrada
(74) *Attorney, Agent, or Firm*—Brinks Hofer Gilson & Lione (57) ABSTRACT

A mounting structure of the on-vehicle electronic circuit unit according to the present invention includes a base plate fixed to a glass plate of an automobile, and a frame mounted on the base plate and surrounded by four side plates. Since recessed parts are provided on the both side of protrusions of the frame, the volume of the frame is reduced. Also, since the tapered portion having a small volume, which is the protruded side of the frame, is protruded to the inside of the automobile, the space of the inside of the automobile becomes enlarged and baggage can be loaded in the vicinity of the glass plate in the rearward of the automobile.

9 Claims, 5 Drawing Sheets

MOUNTING STRUCTURE OF ON-VEHICLE ELECTRONIC CIRCUIT UNIT

This application claims the benefit of priority to Japanese Patent Application No. 2004-168788 filed on Jun. 7, 2004, herein incorporated by reference.

BACKGROUND OF THE INVENTION

1. Field of the Invention

The present invention relates to a mounting structure of an on-vehicle electronic circuit unit suitable for satellite and terrestrial digital audio receivers used for an automobile.

2. Description of the Related Art

Figure 9:
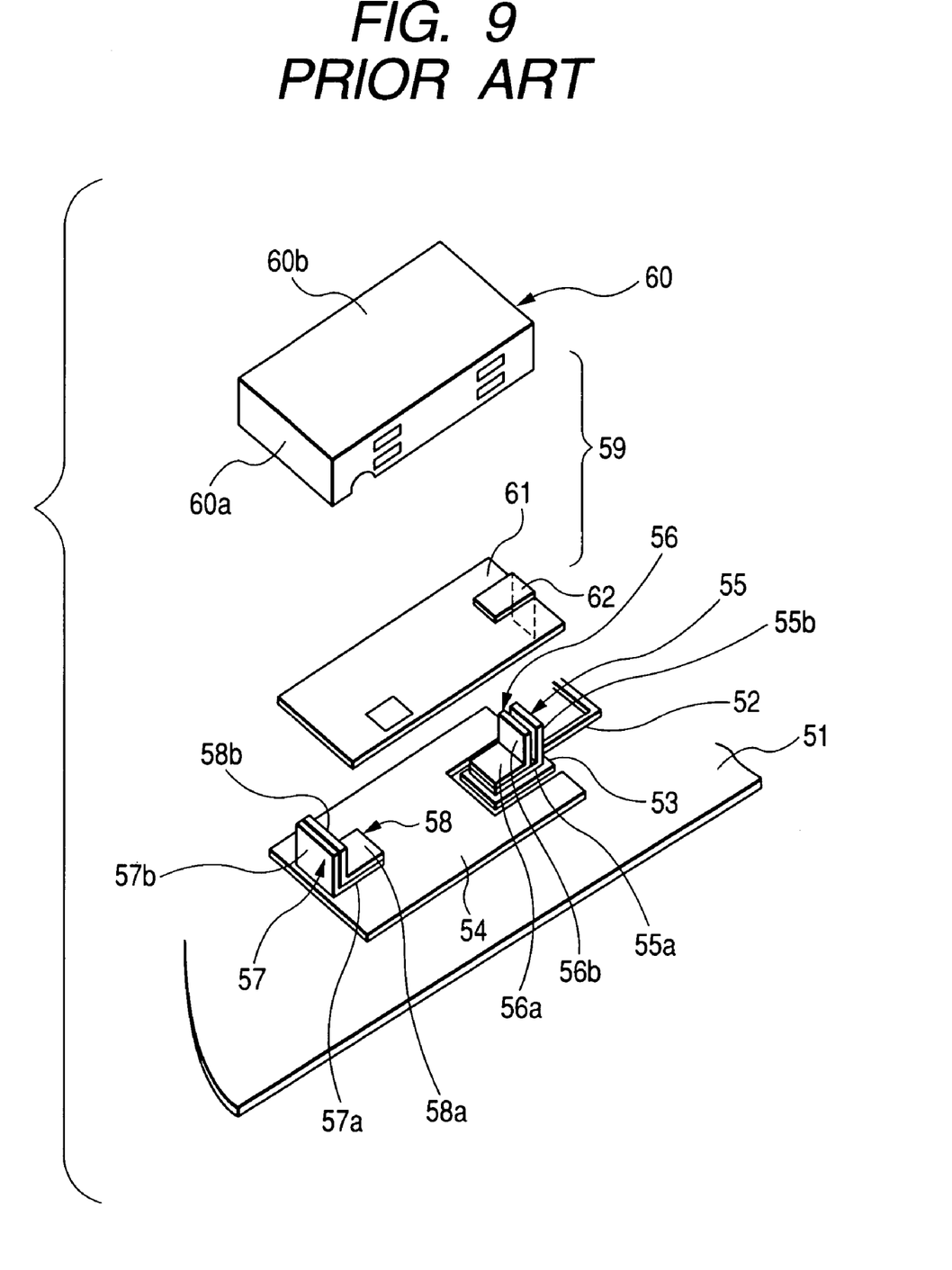
FIG. 9 is an exploded perspective view showing a conventional mounting structure of an on-vehicle electronic circuit unit.

A conventional mounting structure of an on-vehicle electronic circuit unit will be described with reference to the drawings. FIG. 9 is an exploded perspective view showing the conventional mounting structure of the on-vehicle electronic circuit unit, and the conventional mounting structure of the on-vehicle electronic circuit unit will be described below. A glass plate 51 located in the rearward of the automobile is provided with an antenna 52, a power supplying part 53 connected to one end of the antenna 52 and formed by conductive paste, and a conductive layer 54 formed by conductive paste.

Two power supplying terminals 55 and 56 have flat portions 55a and 56a, and supporting portions 55b and 56b bent from the flat portions 55a and 56a, respectively. The power supplying terminals 55 and 56 are mounted on the power supplying part 53 by soldering the flat portions 55a and 56a on the power supplying part 53.

Two ground terminals 57 and 58 have flat portions 57a and 58a, and supporting portions 57b and 58b bent from the flat portions 57a and 58a, respectively. The ground terminals 57 and 58 are mounted on the conductive layer 54 by soldering the flat portions 57a and 58a on the conductive layer 54.

An electronic circuit unit 59 includes a box-shaped cover 60 composed of metal plates, a circuit board 61 composed of a printed board having a desired high frequency circuit (not shown) thereon, and an L-shaped input terminal 62 mounted on the circuit board 61.

Also, the circuit board 61 is mounted in the cover 60 by an appropriate means in the state received in the cover 60 to form the electronic circuit unit 59. The input terminal 62 mounted on the circuit board 61 is inserted between the supporting portions 55b and 56b of the power supplying terminals 55 and 56, so that one side of the electronic circuit unit 59 is supported in the continuity state.

Further, one sidewall 60a bent from the perimeter of a top wall 60b of the cover 60 is inserted between the supporting portions 57b and 58b of the ground terminals 57 and 58, so that the other side of the electronic circuit unit 59 is supported in the continuity state.

That is, the electronic circuit unit 59 has a mounting structure that the input terminal 62 and the cover 60 are inserted between the terminals 55, 56 and 57, 58, respectively (For example, see Japanese Unexamined Patent Application Publication No. 6-291529).

However, in the conventional mounting structure of the on-vehicle electronic circuit unit, since the top wall 60b of the cover 60 is protruded to the inside of the automobile in the state that the area surrounded by the sidewalls 60a is gradually increased toward the top, the volume of the cover 60 is increased. Thus, the space of the inside of the automobile is reduced and the on-vehicle electronic circuit unit hinders the loading of baggage in the vicinity of the glass plate 51 located in the reward of the automobile.

Further, since one of the sidewalls 60a of the cover 60 is inserted between the supporting portions 57b and 58b of the ground terminals 57 and 58, the mounting of the on-vehicle electronic circuit unit is unstable.

Also, since the cover 60 is exposed to the inside of the automobile, the on-vehicle electronic circuit unit makes a poor appearance and the commercial value thereof is impaired.

In the conventional mounting structure of the on-vehicle electronic circuit unit, since the top wall 60b of the cover 60 is protruded to the inside of the automobile in the state that the area surrounded by the sidewalls 60a is gradually increased toward the top, the volume of the cover 60 is increased. Thus, there have been problems in that the space of the inside of the automobile is reduced and the on-vehicle electronic circuit unit hinders the loading of baggage in vicinity of the glass plate 51 located in the reward of the automobile.

Further, since one of the sidewalls 60a of the cover 60 is inserted between the supporting portions 57b and 58b of the ground terminals 57 and 58, there has been a problem in that the mounting of the on-vehicle electronic circuit unit is unstable.

Also, since the cover 60 is exposed to the inside of the automobile, there have been problems in that the on-vehicle electronic circuit unit makes a poor appearance and the commercial value thereof is impaired.

SUMMARY OF THE INVENTION

It is an object of the present invention to provide a mounting structure of an on-vehicle electronic circuit unit capable of enlarging the space of the inside of the automobile, easily loading baggage, and making a good appearance.

According to a first aspect of the present invention to solve the above-mentioned problems, a mounting structure of an on-vehicle electronic circuit unit includes a base plate fixed to a glass plate of an automobile, a frame mounted on the base plate and surrounded by four side plates, a circuit board provided in the frame and having a wiring pattern and electronic components mounted thereon, and a cover for covering an opening region of the frame on the opposite side to the base plate which is mounting side of the frame. The side plates of the frame include two pairs of first and second side plates facing each other respectively, and a pair of the first side plates is formed to be higher than a pair of the second side plates. The first side plates have protrusions located in the middle of the ends thereof and removed portions formed from the both sides of the protrusions to the ends of the second side plates, respectively. The cover has a first covering part for covering between a pair of the protrusions and a second covering part for covering between two pairs of the removed portions respectively, and the first and second covering parts of the cover cover the opening region of the frame along the line of the protrusions and the removed portions. The cover side facing the frame is provided with recessed parts formed along the second side plates in the state the protrusions are interposed therebetween.

In addition, according to a second aspect of the present invention, in the mounting structure of the on-vehicle electronic circuit unit, the removed portions are formed in a slope shape from the ends of the protrusions over the second side plates, respectively.

Further, according to a third aspect of the present invention, in the mounting structure of the on-vehicle electronic circuit unit, the removed portions are formed by rectangular notch portions provided between the ends of the protrusions and the second side plates, and the steps are provided between the ends of the protrusions and the ends of the second side plates, respectively.

Furthermore, according to a fourth aspect of the present invention, the mounting structure of the on-vehicle electronic circuit unit further includes an ornamental case which covers the frame having the cover and the base plate, and is held on the glass plate. The ornamental case has a flat top part, side parts extending from the perimeter of the top part to broaden toward the end thereof, and a receiving part surrounded by the top part and the side parts. The top part of the ornamental case is located over the protrusions in the state that the frame is received in the receiving part, and the side parts cover the base plate and the side plates in the state that the side part is located over the recessed part.

In addition, according to a fifth aspect of the present invention, in the mounting structure of the on-vehicle electronic circuit unit, at least one tall electronic component is mounted on the circuit board located between the protrusions of the first side plates.

Moreover, according to a sixth aspect of the present invention, in the mounting structure of the on-vehicle electronic circuit unit, a plurality of supporting pieces to be mounted to the base plate are provided in the side plates respectively and the supporting pieces are provided at the location closer to the glass plate than the cover.

Also, according to a seventh aspect of the present invention, in the mounting structure of the on-vehicle electronic circuit unit, the cover has a plurality of elastic tongues extending from the perimeter thereof and the elastic tongues are elastically contacted to the perimeter of the protrusions and the second side plates.

In addition, according to an eighth aspect of the present invention, in the mounting structure of the on-vehicle electronic circuit unit, cut grooves extending toward the circuit board are provided in the protrusions of the side plates in the state having the openings opened to one ends respectively, and a cable connected to the wiring pattern has an insulating coating portion for covering a core wire and an elastic heat shrinkable tube which is attached on a part of the outer circumference of the insulating coating portion and has an outer diameter larger than that of the insulating coating portion. The heat shrinkable tube is inserted from the opening in the cut groove and is press-fitted in the cut groove.

Further, according to a ninth aspect of the present invention, the mounting structure of the on-vehicle electronic circuit unit further includes an amplifying circuit, provided on the circuit board, for amplifying power to be supplied to the radiating conductor used for an antenna provided in the glass plate.

DESCRIPTION OF THE PREFERRED EMBODIMENT

Figure 1:
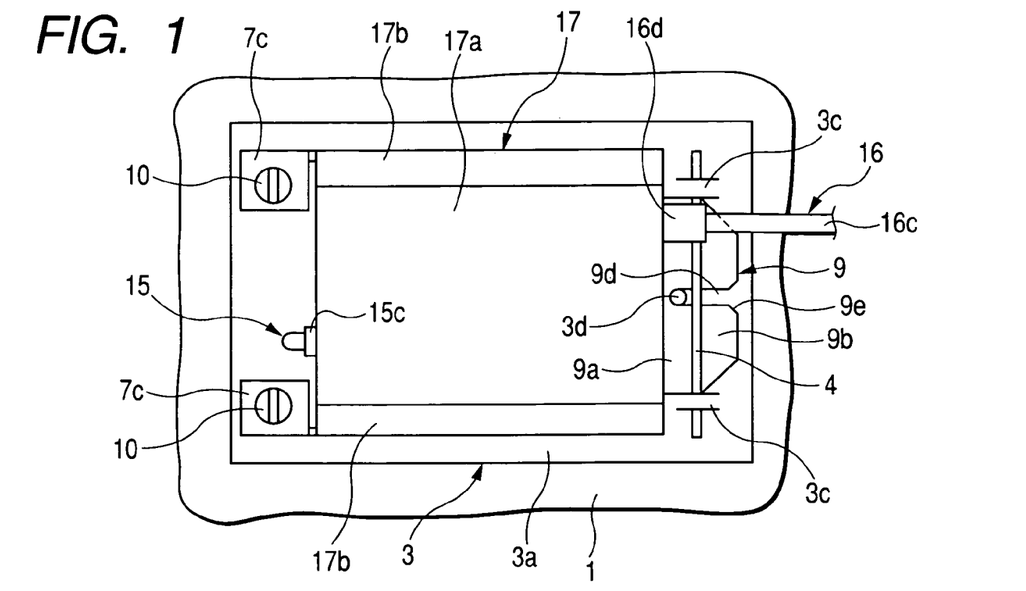
FIG. 1 is a plan view showing a mounting structure of an on-vehicle electronic circuit unit according to the present invention.
Figure 2:
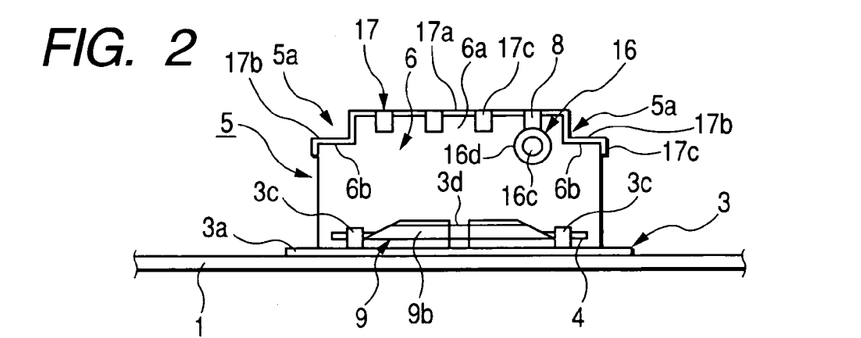
FIG. 2 is a right side view of FIG. 1.
Figure 3:
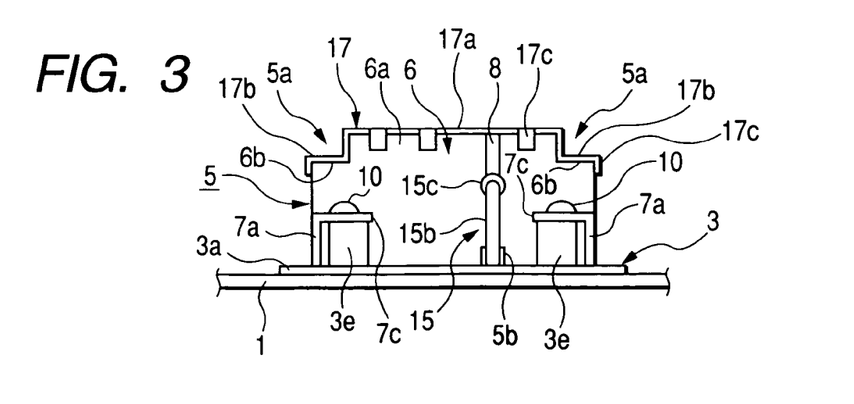
FIG. 3 is a left side view of FIG. 1.
Figure 4:
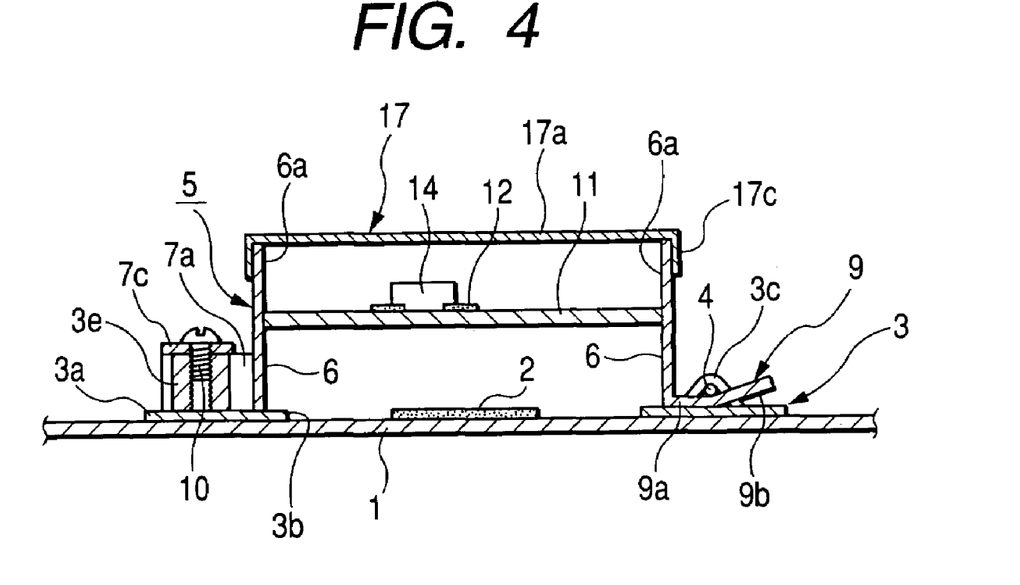
FIG. 4 is a cross-sectional view showing the main parts in the mounting structure of the on-vehicle electronic circuit unit according to an embodiment of the invention.
Figure 5:
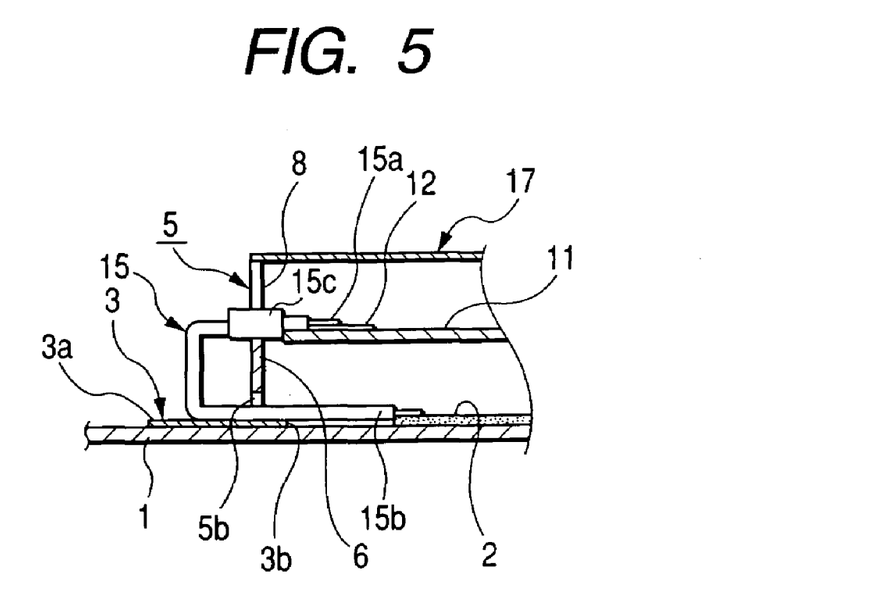
FIG. 5 is a cross-sectional view showing the mounting state of a cable in the mounting structure of the on-vehicle electronic circuit unit according to the embodiment of the invention.

A mounting structure of an on-vehicle electronic circuit unit according to the invention will now be described with reference to the accompanying drawings. FIG. 1 is a plan view showing a mounting structure of an on-vehicle electronic circuit unit according to the invention, FIG. 2 is a right side view of the FIG. 1, FIG. 3 is a left side view of the FIG. 1, FIG. 4 is a cross-sectional view showing main parts of the mounting structure of the on-vehicle electronic circuit unit according to the invention, and FIG. 5 is a cross-sectional view showing the mounting state of a cable in the mounting structure of the on-vehicle electronic circuit unit according to the invention.

Figure 6:
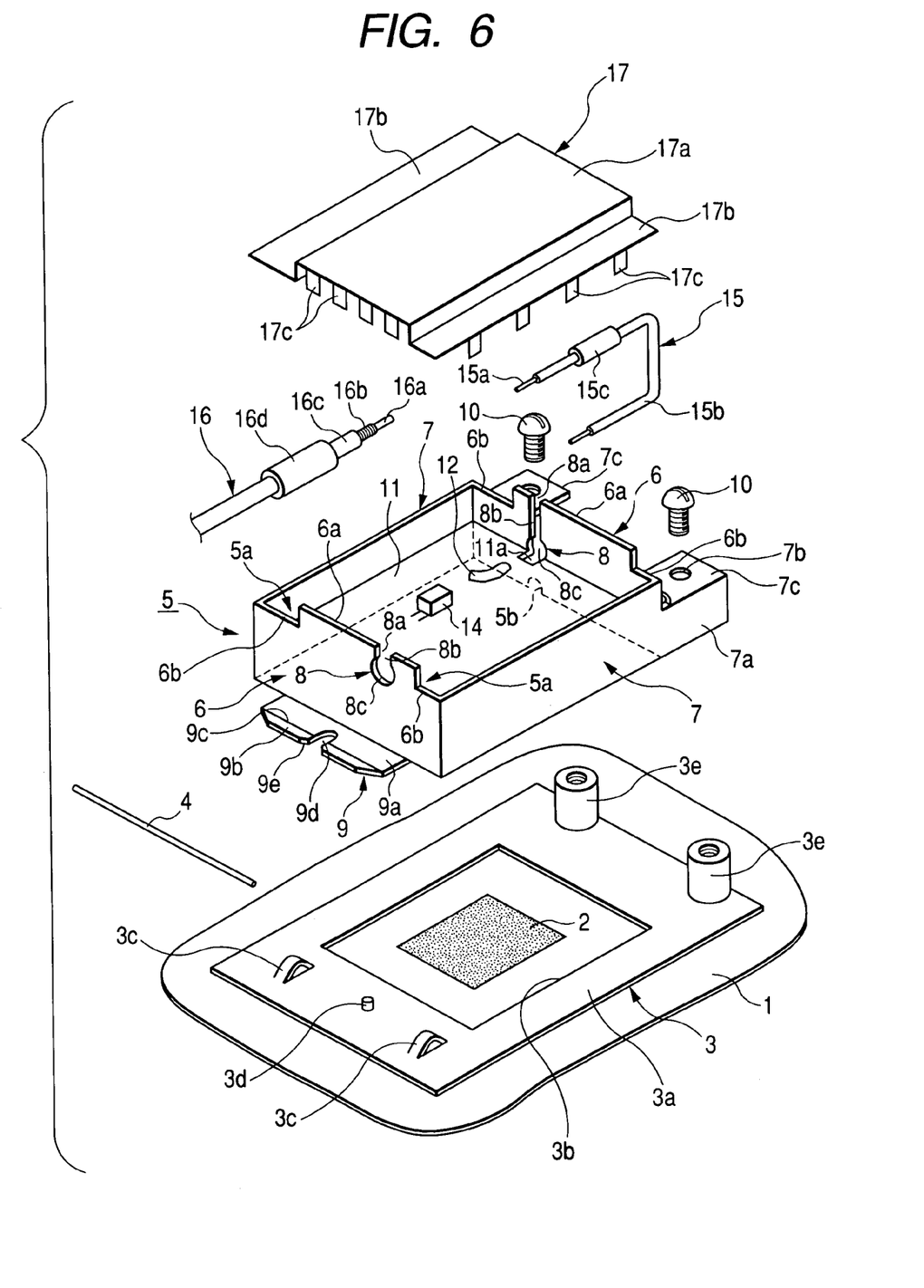
FIG. 6 is an exploded perspective view showing the mounting structure of the on-vehicle electronic circuit unit according to the embodiment of the invention.
Figure 7:
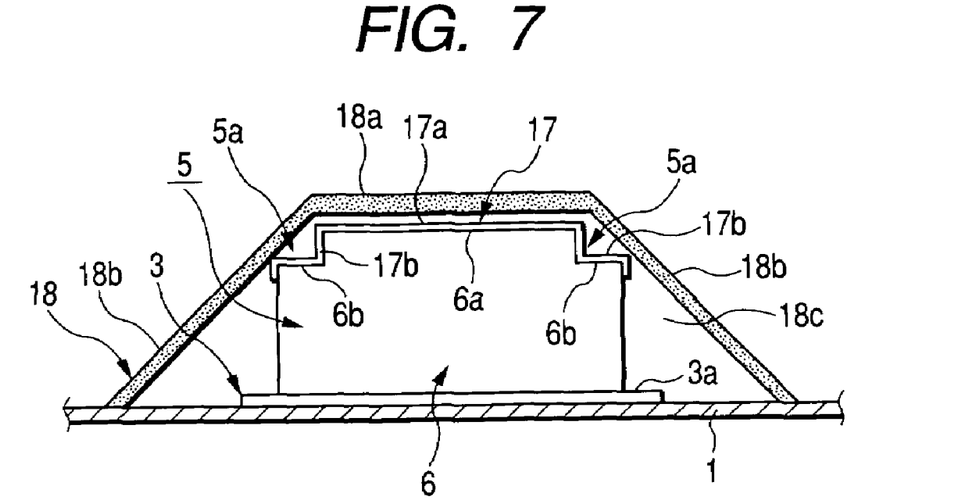
FIG. 7 is a cross-sectional view showing the arrangement state of an ornamental case in the mounting structure of the on-vehicle electronic circuit unit according to the embodiment of the invention.
Figure 8:
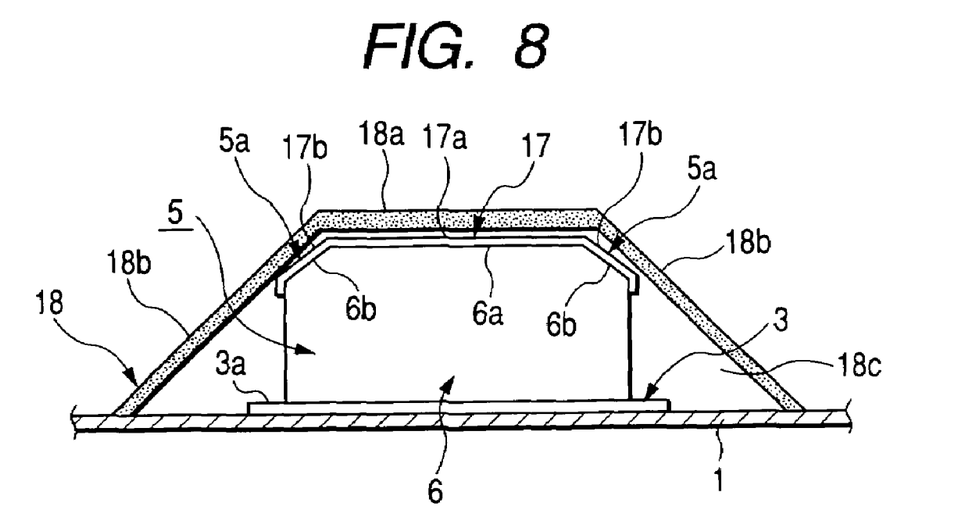
FIG. 8 is a cross-sectional view showing the arrangement state of an ornamental case in a mounting structure of the on-vehicle electronic circuit unit according to another embodiment of the invention.

Further, FIG. 6 is an exploded perspective view showing the mounting structure of the on-vehicle electronic circuit unit according to the present invention, FIG. 7 is a cross-sectional view showing the arrangement state of an ornamental case in the mounting structure of the on-vehicle electronic circuit unit according to the present invention, and FIG. 8 is a cross-sectional view showing the arrangement state of an ornamental cable in a mounting structure of the on-vehicle electronic circuit unit according to another embodiment of the invention.

Hereinafter, the mounting structure of the on-vehicle electronic circuit unit according to the invention is described with reference to FIGS. 1 to 7. A glass plate 1 located at the rear of an automobile is provided with a radiating conductor 2, serving an antenna element constituting a part of an antenna (patch antenna). The radiating conductor 2 is provided between laminated layers of the glass plate 1 or on the inner surface of the glass plate 1 in the automobile.

A base plate 3 made of a metal plate has a flat base part 3a, a quadrangular hole 3b provided in the middle of the base part 3a, two locking parts 3c formed on one side of the base part 3a by cutting and raising the base plate 3a, a projecting part 3d disposed between the two locking parts 3c, and two cylindrical mounting stages 3e having thread holes, respectively, which are provided along another side of the base part 3a to face the side along which the locking parts 3c having the quadrangular hole 3b therebetween are provided.

The base plate 3 is fixed to the glass plate 1 by an adhesive or by soldering conductors (not shown) which are provided on the inner surface of the glass plate 1 in the automobile, so that the radiating conductor 2 is located in the hole 3b at the time when the base plate 3 is fixed.

A spring member 4 made of a piano wire or the like is locked by the two locking parts 3c in the state in which it set over between the two locking parts 3c formed by cutting and raising the base plate 3a.

The spring member 4 may be provided with a retaining means (not shown) such that it is retained in the locking parts 3c by the bending.

A frame 5 composed of metal plates has a pair of first side plates 6 and a pair of second side plates 7, the two first side plates 6 or the two second side plates 7 facing each other, and thus the frame 5 is surrounded by the four plates. Thus, the frame 5 is formed in a rectangular box shape with the upper and lower surfaces thereof opened.

Each of the pair of the first side plates 6 facing each other has a protrusion 6a provided in the middle of one end thereof and a removed portion 6b formed on the both sides of the protrusion 6a by a rectangular notch portion.

The removed portions 6b are provided over the ends of the second side plates 7 respectively, and the height of the lower side of the removed portion 6b is equal to the end of the second side plate 7. As a result, one end of the frame 5 is provided with recessed parts 5a that are recessed from both sides of the tall protrusion 6a, and the protrusions 6a of the frame 5 has a narrow top.

In addition, two cut grooves 8 are provided in the protrusions 6a of the tall first side plates 6 respectively, and the cut grooves 8 each have an opening 8a with one end thereof opened, a groove part 8b linearly extended from the opening 8a, and a circular through hole 8c that communicates with one end of the groove part 8b and that has a diameter larger than the width of the groove parts 8b.

Further, one of the first side plates 6 is provided with a plate-shaped tongue 9 which is bent from the end of the first plate opposite to the protrusion 6a and which protrudes from the frame 5 to the outside. The tongue 9 has a wide part 9a, a trapezoidal tapered tip part 9b formed to narrow the width thereof toward the tip, a bent part 9c that is bent so as to lift the tapered tip part 9b, a cut groove part 9d formed over the wide part 9a from the tapered tip part 9b, and a sloped part 9e formed to widen the width thereof toward the tip.

Furthermore, the second side plates 7 have a pair of leg parts 7a linearly projecting from the one first side plate 6 facing the other first side plate 6 having the tongue 9, and supporting pieces 7c that are bent from the leg parts 7a at a right angle and that have holes 7b in the middle thereof respectively. The supporting pieces 7c are provided within the height range of the first and second side plates 6 and 7.

First, the frame 5 having the above-mentioned construction is press-fitted between the base part 3a and the spring member 4 so that the tapered tip part 9b of the tongue 9 resists the elasticity of the spring member 4 by locating the projecting part 3d in the cut groove part 9d of the tongue 9 and by guiding the projecting part 3d.

In this case, it is easy to fit the projecting part 3d into the cut groove part 9d by the sloped part 9e provided at the tip part of the cut groove part 9d, and to press-fit the tongue 9 between the base plate 3a and the spring member 4 by the bent part 9c.

Next, when the frame 5 is pressed against the glass plate 1 after completing the press-fitting operation of the tongue 9, the supporting pieces 7c are placed on the mounting stages 3e, respectively. In this state, mounting of the frame 5 is completed by fastening screws 10 into the thread holes of the mounting stages 3e through the holes 7b, respectively.

One side of the frame 5 is supported by the screws 10, and the other side thereof is supported by the elasticity of the spring member 4.

According to the above-mentioned mounting structure of the frame 5, since the screws 10 are easily fastened on one side of the frame 5, workability is improved. Also, it is possible to easily remove the frame 5 by loosening the screws 10 from the mounting stages 3e.

A circuit board 11 consisted of a printed board has a notch portion 11a provided on one edge thereof, a wiring pattern 12 provided on one surface thereof, and various components 14 mounted on one surface thereof. Also, a desired electric circuit including an amplifying circuit is formed on the circuit board 11.

The circuit board 11 is mounted in the frame 5 by suitable means, such as soldering or a bending piece (not shown). When the circuit board 11 is mounted in the frame 5, the notch portion 11a faces at least one cut groove 8 and at least one tall electronic component 14 located on one surface (upper surface) is disposed between the tall protrusions 6a of the first side plates 6.

A power supplying cable 15 has a core wire 15a, an insulating coating portion 15b for covering the core wire 15a, and an elastic heat shrinkable tube 15c which is attached on a part of the outer circumference of the insulating coating portion 15b and which has an outer diameter larger than that of the insulating coating portion 15b.

In the power supplying cable 15, one end of the core wire 15a is connected to the radiating conductor 2, and the heat shrinkable tube 15c is press-fitted in the through hole 8c from the opening 8a of the cut groove 8 through the groove part 8b and is held in the through hole 8c in the state in which a part of the power supplying cable 15 is protruded to the outside through the notch portion 5b of the frame 5.

In this case, the insulating coating portion 15b or/and the heat shrinkable tube 15c is/are located in the notch portion 11a of the circuit board 11, and the other end of the core wire 15a is connected to the wiring pattern 12. A patch antenna is formed by the power supplying cable 15, the radiating conductor 2, and grounding conductor (not shown).

A lead cable 16 is made up of a coaxial cable, and has a core wire 16a, a reticulated outer conductor 16b insulated from the core wire 16a, an insulating coating portion 16c for covering the outer conductor 16b, and an elastic heat shrinkable tube 16d which is attached on a part of the outer circumference of the insulating coating portion 16c and has an outer diameter larger than that of the insulating coating portion 16b.

The core wire 16a at one end of the lead cable 16 is connected to the wiring pattern 12, and the other end of the lead cable 16 is connected to an electronic device (not shown) received in a dashboard or the like of an automobile in the state in which the heat shrinkable tube 16d is press-fitted to the through hole 8c from the opening 8a of the cut groove 8 through the groove part 8b.

A cover 17 formed by bending a metal plate has a flat first covering part 17a, an L-shaped second covering part 17b provided on both sides of the first covering part 17a, and a plurality of elastic tongues 17c formed by bending from the edges of the first and second covering parts 17a and 17b.

The first covering part 17a is covered along the lines of the protrusions 6a, and the second covering part 17b is covered along the lines of the removed portions 6b. Accordingly, the cover 17 covers entire opening region of the frame 5.

In this case, the elastic tongues 17c come into elastic contact with the outer surface of the tall protrusions 6a and the outer surface of the short second side plate 7, so that the cover 17 is mounted on the frame 5.

Furthermore, when the cover 17 covers the frame 5, the first covering part 17a of the cover 17 has a small area, since recessed parts 5a whose corner portions are recessed along the second side plates 7 are provide at both sides of each of the protrusions 6a.

An ornamental case 18 formed, for example, by molding a synthetic resin has a trapezoidal shape, and includes a flat top part 18a, side parts 18b extending from the perimeter of the top part 18a to broaden toward the end thereof, and a receiving part 18c surrounded by the top part 18a and side parts 18b, as shown in FIG. 7.

The ornamental case 18 is removably mounted on the glass plate 1 by suitable means with the base plate 3, the frame 5, and the cover 17 encased in the receiving part 18c. Accordingly, the entire electronic circuit unit is covered with the ornamental case 18 resulting in a good appearance.

In addition, when the ornamental case 18 is mounted, the side parts 18b extend to broaden toward the end thereof so that the top part 18a is located over the protrusions 6a and the first covering part 17a, and vicinities of the upper ends of the side parts 18b are located over the recessed parts 5a.

As a result, since the top part 18a having a small area projects toward the inside of the automobile, it is possible to enlarge the inner space of the automobile, and to obtain an inner space suitable for loading baggage or the like in the vicinity of the glass plate 1 in the automobile.

Moreover, FIG. 8 shows another embodiment of the mounting structure of the on-vehicle electronic circuit unit according to the invention. According to this embodiment, the removed portions 6b provided in the first side plates 6 of the frame 5 are formed to be inclined from the both sides of each of the protrusions 6a to the second side plate 7, and thus the recessed parts 5a are provided at the both sides of each of the protrusions 6a. In addition, the ornamental case 18 is covered with the side parts 18b of the ornamental case 18 located facing the recessed part 5a.

Since the other configuration of this embodiment is the same as those in the above-mentioned embodiment, same reference numerals are given to the same components and the description thereof will be omitted in this specification.

The mounting structure of the on-vehicle electronic circuit unit according to the present invention includes a base plate fixed to a glass plate of an automobile, a frame mounted on the base plate and surrounded by four side plates, a circuit board provided in the frame and having a wiring pattern and electronic components mounted thereon, and a cover for covering an opening region of the frame on the opposite side to the base plate which is mounting side of the frame. The side plates of the frame include two pairs of first and second side plates facing each other respectively, and a pair of the first side plates is formed to be higher than a pair of the second side plates. The first side plates have protrusions located in the middle of the ends thereof and removed portions formed from the both sides of the protrusions to the ends of the second side plates, respectively. The cover has a first covering part for covering between a pair of the protrusions and a second covering part for covering between two pairs of the removed portions respectively, and the first and second covering parts of the cover cover the opening region of the frame along the line of the protrusions and the removed portions. The cover side facing the frame is provided with recessed parts formed along the second side plates in the state that the protrusions are interposed therebetween.

Accordingly, since the recessed parts are provided on the both side of the protrusions of the frame, the volume of the frame is reduced. Also, since the tapered portion having a small volume, which is the protruded side of the frame, is protruded to the inside of the automobile, the space of the inside of the automobile becomes enlarged and baggage can be loaded in the vicinity of the glass plate in the rearward of the automobile.

In addition, since the removed portions are formed in a slope shape from the ends of the protrusions over the second side plates respectively, the structure is simple and the structure of the cover becomes simple. Accordingly, the workability is improved.

Further, the removed portions are formed by rectangular notch portions provided between the ends of the protrusions and the second side plates, and steps are provided between the ends of the protrusions and the ends of the second side plates, respectively. Therefore, the large recessed parts are obtained and the miniaturization of the frame is facilitated.

Furthermore, the mounting structure of the on-vehicle electronic circuit unit according to present invention further includes an ornamental case which covers the frame including the cover and the base plate, and is held on the glass plate. The ornamental case has a flat top part, side parts extending from the perimeter of the top part to broaden toward the end thereof, and a receiving part surround by the top part and the side parts. The top part of the ornamental case is located over the protrusions in the state that the frame is received in the receiving part, and the side parts cover the base plate and the side plates in the state that the side part is located over the recessed part.

Accordingly, when using the ornamental case, it is possible to obtain a good appearance of the electronic circuit unit by covering the whole electronic circuit unit. Also, since the top part having a small volume is protruded to the inside of the automobile by locating the side parts broadened toward the end thereof over the recessed parts, the space of the inside of the automobile is enlarged and baggage can be easily loaded in the vicinity of the glass plate located in the reward of the automobile.

In addition, since at least one tall electronic component is mounted on the circuit board located between the protrusions of the first side plates, the miniaturization of the frame is facilitated.

Moreover, since a plurality of supporting pieces to be mounted to the base plate are provided in the side plates respectively, and the supporting pieces are provided at the location closer to the glass plate than the cover, it is possible to lowering the installing location of the supporting pieces. Therefore, the miniaturization of the frame is facilitated.

Further, the cover has a plurality of elastic tongues extending from the perimeter thereof and the elastic tongues are elastically contacted to the perimeter of the protrusions and the second side plates. Accordingly, it is possible to securely mount the cover on the frame and reliably ground the cover to the frame.

Furthermore, cut grooves extending toward the circuit board are provided in the protrusions of the side plates in the state having the openings opened to one ends respectively, and a cable connected to the wiring pattern has an insulating coating portion for covering a core wire and an elastic heat shrinkable tube which is attached on a part of the outer circumference of the insulating coating portion and has an outer diameter larger than that of the insulating coating portion. Also, the heat shrinkable tube is inserted from the opening in the cut groove and is press-fitted in the cut groove. Therefore, the cut grooves formed in the location of the protrusions can be formed with a sufficient depth, and the cable can be held (mounted) by being inserted from the opening into the cut groove. Further, the mounting operation of the cable becomes simple, and it is possible to improve productivity and to reduce cost.

Also, since the cable is provided with the elastic heat shrinkable tube, the heat shrinkable tube is simply attached to the cable and cost is reduced. Further, the heat shrinkable tube is securely held by the elasticity thereof in the cut groove and the cable can be surely mounted.

In addition, since the on-vehicle electronic circuit unit according to present invention further includes an amplifying circuit provided on the circuit board, and for amplifying power to be supplied to the radiating conductor used for an antenna provided in the glass plate, it is possible to reliably supply power and improve the signal processing.

The invention claimed is:

1. A mounting structure of an on-vehicle electronic circuit unit comprising:
   a base plate fixed to a glass plate of an automobile;
   a frame mounted on the base plate and surrounded by four side plates;
   a circuit board provided in the frame, and having a wiring pattern and electronic components mounted thereon; and
   a cover for covering an opening region of the frame on an opposite side to the base plate which is a mounting side of the frame;
   wherein the side plates of the frame include two pairs of first and second side plates facing each other respectively, the pair of the first side plates being formed to be higher than the pair of the second side plates, and the first side plates having protrusions located in a middle of ends thereof, and removed portions formed from the both sides of the protrusions to ends of the second side plates, respectively,
   wherein the cover has a first covering part for covering between a pair of the protrusions and a second covering part for covering between two pairs of the removed portions respectively, and the first and second covering parts cover an opening region of the frame along a line of the protrusions and the removed portions, and
   wherein a side of the cover facing the frame is provided with recessed parts formed along the second side plates in the state the protrusions are interposed therebetween.

2. The mounting structure of the on-vehicle electronic circuit unit according to claim 1,
   wherein the removed portions are formed in a slope shape from ends of the protrusions over the second side plates, respectively.

3. The mounting structure of the on-vehicle electronic circuit unit according to claim 1,
   wherein the removed portions are formed by rectangular notch portions provided between ends of the protrusions and the second side plates, and steps are provided between the ends of the protrusions and the ends of the second side plates, respectively.

4. The mounting structure of the on-vehicle electronic circuit unit according to claim 1, further comprising:
   an ornamental case, which covers the frame including the cover and the base plate and is held on the glass plate,
   wherein the ornamental case has a flat top part, side parts extending from a perimeter of the top part to broaden toward an end thereof, and a receiving part surrounded by the top part and the side parts, and
   wherein the top part of the ornamental case is located over the protrusions in the state that the frame is received in the receiving part, and the side parts cover the base plate and the side plates in the state that the side parts are located over the recessed parts.

5. The mounting structure of the on-vehicle electronic circuit unit according to claim 1,
   wherein at least one tall electronic component is mounted on the circuit board located between the protrusions of the first side plates.

6. The mounting structure of the on-vehicle electronic circuit unit according to claim 1,
   wherein a plurality of supporting pieces to be mounted to the base plate are provided in the side plates respectively, and the supporting pieces are provided at a location closer to the glass plate than the cover.

7. The mounting structure of the on-vehicle electronic circuit unit according to claim 1,
   wherein the cover has a plurality of elastic tongues extending from a perimeter thereof and the elastic tongues are elastically contacted to a perimeter of the protrusions and the second side plates.

8. The mounting structure of the on-vehicle electronic circuit unit according to claim 1,
   wherein cut grooves extending toward the circuit board are provided in the protrusions of the side plates in the state having openings opened to one ends respectively,
   wherein a cable connected to the wiring pattern has an insulating coating portion for covering a core wire and an elastic heat shrinkable tube which is attached on a part of an outer circumference of the insulating coating portion and has an outer diameter larger than that of the insulating coating portion, and
   wherein the heat shrinkable tube is inserted from the opening in the cut groove and is press-fitted in the cut groove.

9. The mounting structure of the on-vehicle electronic circuit unit according to claim 1, further comprising:
   an amplifying circuit, provided on the circuit board, for amplifying power to be supplied to a radiating conductor used for an antenna provided in the glass plate.

* * * * *